July 3, 1928.
J. ANDRADE
1,675,685
RUMBLE SEAT FOR AUTOMOBILE BODIES
Filed June 12, 1925   3 Sheets-Sheet 3
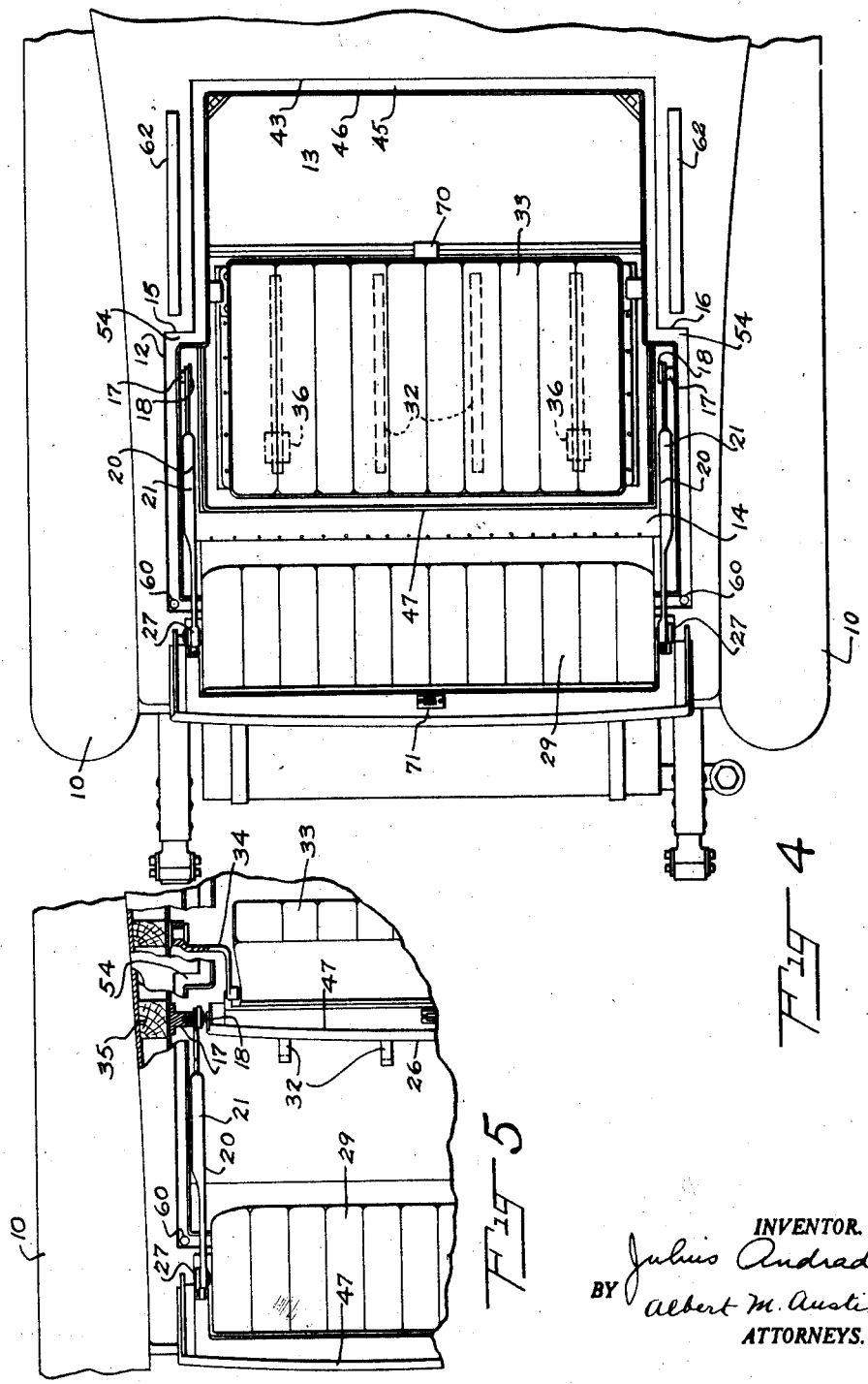
INVENTOR.
Julius Andrade
BY Albert M. Austin
ATTORNEYS.

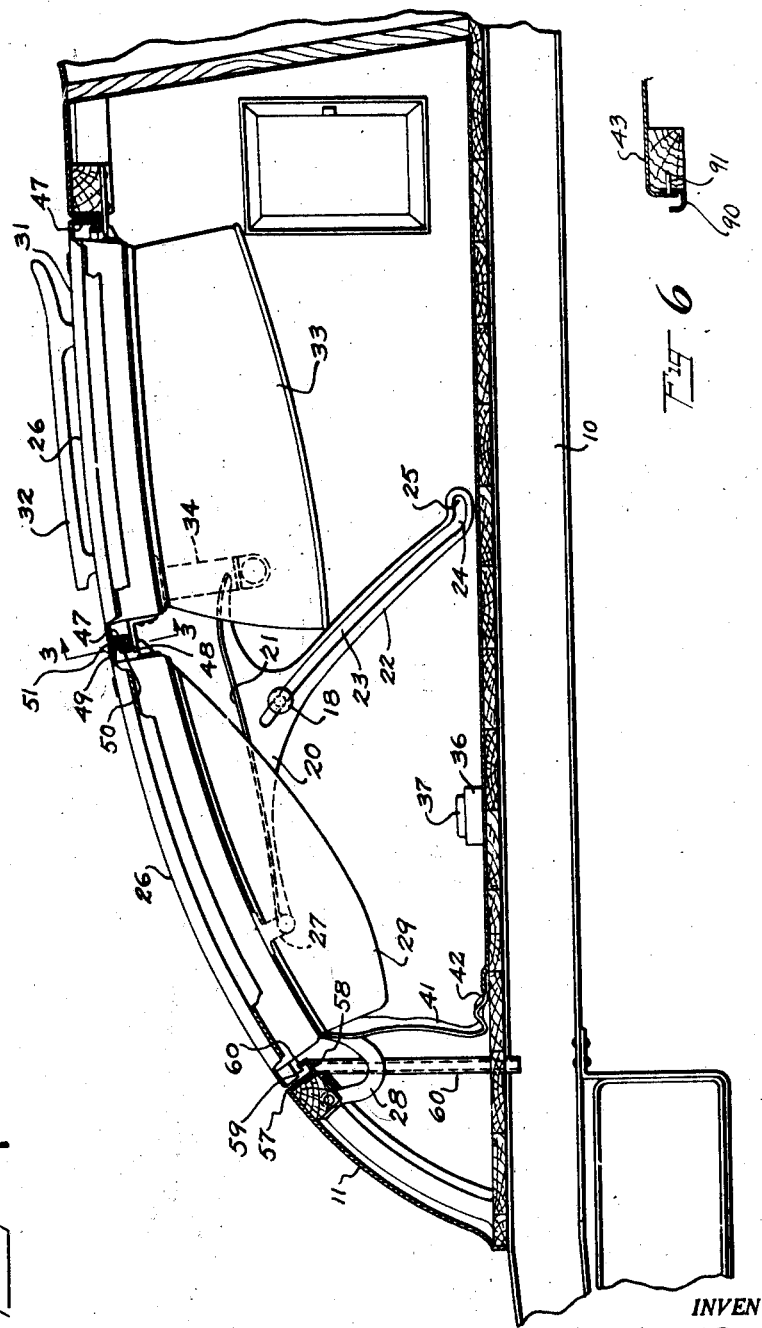

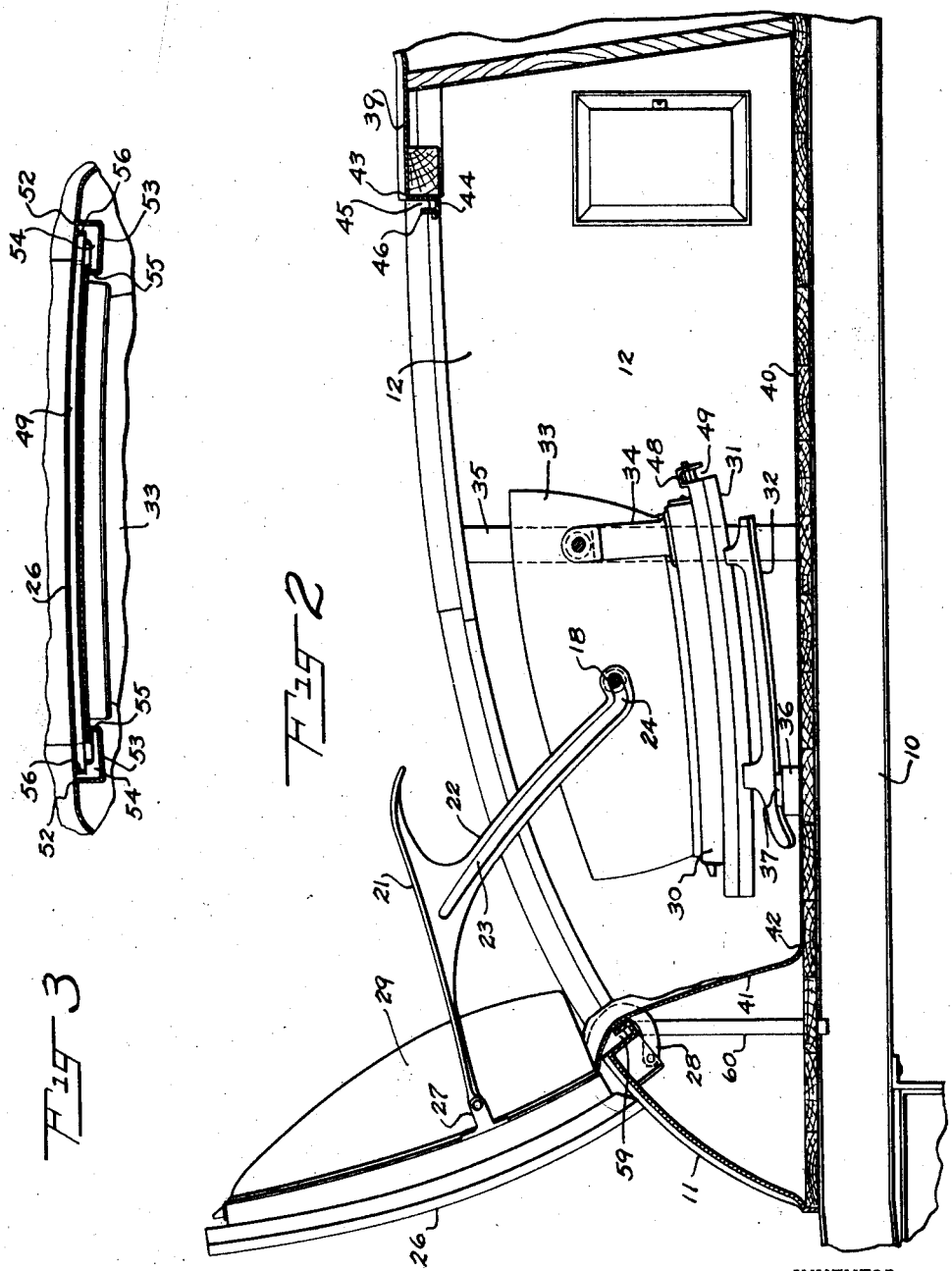

Patented July 3, 1928.

1,675,685

UNITED STATES PATENT OFFICE.

JULIUS ANDRADE, OF EAST CLEVELAND, OHIO, ASSIGNOR TO CHANDLER MOTOR CAR COMPANY, OF CLEVELAND, OHIO, A CORPORATION OF OHIO.

RUMBLE SEAT FOR AUTOMOBILE BODIES.

Application filed June 12, 1925. Serial No. 36,608.

This invention relates to vehicle bodies and particularly to rumble seats for automotive vehicles.

The invention has particular reference to automotive vehicles of the so called roadster type, in which there is provided a spare seat in the rear portion of the vehicle which may be folded away conveniently when not in use.

One object of the invention relates to the provision of a waterproof storage space under the seat when folded, and in accordance with this object there is provided on the cover portions of the device a plurality of gutters which are adapted to empty rain water into one another.

Another object relates to the provision of a rumble seat which in opened position provides sufficient room to permit a passenger to step directly to the floor of the car without having to walk upon the upholstery of the seat. Furthermore, the cushions, when the seat is in the closed position, are suspended in spaced relation with the floor of the car, so that ample room is provided for storage and so that soiling thereof by contact with the floor of the vehicle is effectively avoided.

An important feature of the improved construction is that when the device is in folded or closed position, the exterior of the vehicle is free of undesirable projections such as hinges, handles or knobs.

Various other objects and advantages of the invention will be obvious from the following particular description of one form of mechanism embodying my invention; or from an inspection of the accompanying drawings; also the invention consists in certain new and novel features of construction and combination of parts hereinafter set forth and claimed.

Fig. 1 is a sectional view taken on the center line of an automotive vehicle embodying features of the invention, taken with the seat in folded position;

Fig. 2 is a similar sectional view with the lids open into position for use;

Fig. 3 is a section taken on the line 3—3 of Fig. 1;

Fig. 4 is a plan view of the rear portion of the automotive vehicle of Fig. 1, with the lids in open position;

Fig. 5 is a similar vew with the back rest portion and the seat bottom in partially raised position; and Fig. 6 is a detailed sectional view of a modified form of the gutter of Fig. 2.

Like reference characters denote like parts in the several figures.

Referring to the drawings, there is shown an automotive vehicle 10, having a rear deck 11, as indicated in Figs. 1 and 2. An aperture 12 (Fig. 4) is cut into the vehicle body, and the configuration of the aperture is such that there is a front portion 13, a rear portion 14 of relatively greater width, and offsets 15, 16 between the front portion and the rear portion. A bracket 17 is secured to frame of the vehicle body, one on each side, within the outline of the rear or enlarged portion 14 of the aperture 12, but outwardly of the outline of the front or narrow portion 13. A pin or bolt 18 is provided in each bracket 17 for a purpose which will subsequently be set forth.

The rumble seat comprises two independently movable lids, which, for convenience of expression will be designated herein the seat bottom, and the back rest respectively. The back rest comprises two spaced members 20, 20, each having a broadened top 21 formed and finished to form a conventional arm rest, and having a slotted arm 22 integral therewith and extending at an acute angle from an intermediate portion of the top 21. Each arm has a slot 23 which is engaged by the respective bolt 18 to form a pin and slot connection between the back rest and the bracket 17.

The slot 23 takes a sharp bend 24 near its free end so as to form a pivot at 25 (see Fig. 1) for easy rotation of the back rest. The back rest also includes a metal facing 26 finished so as to conform with the exterior surface of the vehicle body, and coextensive with the rear portion 14 of the aperture 12, and is provided with a pair of spaced brackets, such as 27, which are each pivotally connected with the rear end of the respective top 21 of the member 20. The back rest is also secured to a plurality of curved brackets such as 28, which are pivotally mounted on the body of the vehicle. Thus the back rest is supported mainly upon the brackets 28 but is guided in movement by the pin and slot connection with the brackets 17. The inner or forward face of the back rest is provided with padded upholstery 29 for the comfort of the passenger.

The rumble seat bottom comprises a main portion 30 having a metal facing 31 finished to conform with the exterior surface of the vehicle body. A plurality of spaced bars such as 32, may be secured to the outer face 31. The side of the portion 30 which is above when the seat is in its open position is provided with upholstery 33, and forms a seat for the passenger. The portion 30 is provided at its lateral edges, near the forward end, with a pair of brackets such as 34, each of which is pivotally secured to a frame member 35 of the car. The upholstery 33 of seat bottom is less in width than the front portion 13 of the aperture 12, and the width of the metal facing 31 is just sufficient to cover the aperture when the seat is in closed position. A pair of rests, such as 36, covered with a yielding material 37 are affixed to the floor of the car, and are so positioned as to be engaged by two of the metal bars 32 so as to support the seat bottom when in open position.

The aperture 12 is lined by a waterproof material 40, and there is secured to the back rest a curtain 41 which may be tacked down as at 42. The body of the vehicle includes a metal sheet 43 which is bent around the edge of the aperture 13 as at 43 to form a gutter 44 having a drip basin 45 and a lip 46. The edge of the metal facing 31 of the seat bottom is bent to form a drip bead 47 which in the closed position of the seat extends into the basin 45 of the gutter 44. It is understood that the periphery of the aperture 12 is provided throughout with similar gutters and the cooperating seat portions with similar drip beads so that rain water is deposited in the basin 45.

The rear edge of the metal facing 31 of the seat bottom is bent as at 47 to form a gutter 48 having a drip basin 49 and a lip 50. The front edge of the metal facing 26 of the back rest is bent to form a drip bead 51 which in the closed position of the seat extends into the basin 49 of the gutter 48.

In the modified form of gutter shown in Fig. 6 the gutter is formed of a separate bent metal sheet 90 constructed to form a gutter basin contiguous to the periphery of the aperture, and fastened to the body as by nails such as 91, and in this embodiment the body metal 43 is carried over the edge to fasten to the outside of the vertical portion of the gutter. The water thus enters the gutter basin, and can not get between the gutter and the frame of the body.

The metal body facing 43 along the lateral edges of the aperture 12 is bent as at 52 (see Fig. 3) to form a gutter 53 having a relatively wide drip basin 54 and a lip 55. The complementary edge of the back rest is provided with a drip bead 56 extending into the basin 54 of the gutter 53. The drip basin 49 of the gutter 48 empties into the drip basin 54 of the gutter 53 as clearly shown in Fig. 3. Thus the rain water empties into the gutters and flows toward the rear of the car by gravity, there being a slope as indicated in the drawings, to conform to the design of the vehicle body. At the rear of the aperture 14, the metal facing of the body is bent as at 57 to form a gutter 58, having a drip basin 59.

For draining the entire system of gutters, there is provided suitable means such as a pair of drain tubes 60—60 extending downwardly through the floor of the car, and employing the rain water on the ground.

The seat parts are maintained in closed position by means of a spring latch comprising a latch seat 70 secured to one edge of the seat bottom 30, and a cooperating latch tongue 71 secured to the adjacent edge of the back rest.

In operation, the normal position of the device being shown in Fig. 1, when it is desired to open the seat for use, the latch 70, 71 is unlocked and the forward end of the back rest is lifted, so as to rotate the back rest towards the rear direction as viewed in Fig. 1. The slotted arms 22 ride on the bolts 18 until the sharp bend 24 is reached in each case after which the arms fall by gravity so as to maintain the back rest in upright position as shown in Fig. 2. At the same time the seat bottom is rotated towards the rear until at least some of the metal bars 32 contact with the rests 36, and the seat is thus maintained in the position shown in Fig. 2.

The seat may be returned to closed position by returning the seat bottom and the back rest by a rotation towards the front into the position of Fig. 1.

Thus it will be seen that I have provided an improved seat which is readily arranged for use when required, and which affords ample leg room for its occupants, and which when closed presents a neat appearance and is substantially waterproof. The interconnecting gutters provided take care of the rain water so that it is discharged outwardly of the vehicle body. Each seam registers with a drain basin of a cooperating gutter and forms a low portion for water to drip off, thus forcing the water into the gutter.

While I have shown and described and have pointed out in the annexed claims certain novel features of my invention, it will be understood that various omissions, substitutions and changes in the forms and details of the device illustrated and in its operation may be made by those skilled in the art without departing from the spirit of the invention.

I claim—

1. In a vehicle, a rumble seat comprising a pair of lids of relatively different widths folding into the body of the vehicle, and arranged in closed position so that an edge of one of said lids is contiguous with an edge of the other lid, a drip bead on one of said contiguous edges, a gutter basin on the other of said edges to catch liquid dropping from said drip bead, and a gutter secured to the body of the vehicle into which liquid from said basin may discharge.

2. In a vehicle, a rumble seat folding into openings of different widths cut in the body of the vehicle, comprising a pair of rotatable lids coextensive with and forming covers for the openings respectively and rotatable into position as seat parts, drip basins skirting the openings, drip beads on the edges of the lids and arranged to engage in said basins when the seat is closed, and a drip basin on one edge of one of said lids emptying into the drip basins of the opening.

3. In a vehicle, a rumble seat comprising a pair of lids of relatively different widths folding into the body of the vehicle, and arranged in closed position so that an edge of one of said lids is contiguous with an edge of the other lid, a drip bead on one of said contiguous edges, a gutter basin on the other of said edges to catch liquid dropping from said drip bead, a gutter secured to the body of the vehicle into which liquid from said basin may discharge, and a drain for discharging liquid from the last named gutter outwardly of the vehicle body.

4. In a vehicle body, the combination with a deck having an aperture therein, a back rest normally forming a cover for a first part of said aperture, a seat bottom normally forming a cover for a second part of said aperture, the edge of said aperture and the edge of said seat bottom having a gutter surrounding the first part of said aperture when said seat bottom is in normal position, and means for pivotally mounting said back rest so that it may be swung from its open position wholly above said deck to a closed position, said seat back having means cooperating with said gutter for draining water.

5. In a vehicle body, the combination with a deck having an aperture therein, a back rest normally forming a cover for a first part of said aperture, a seat bottom normally forming a cover for another part of said aperture, means for mounting said back rest and seat bottom respectively for movement to usable position, and means for collecting and draining water at the joint between said seat bottom and back rest and at the joint between said seat bottom and back rest and the deck.

In testimony whereof I have hereunto set my hand.

JULIUS ANDRADE.